June 16, 1925.

B. J. HUBBARD

AUTOMOBILE SIGNAL

Filed Jan. 13, 1917

1,541,816

2 Sheets-Sheet 1

WITNESSES:
Karl A. Peters.
N. L. Lawrence

INVENTOR.
Burtt J. Hubbard
BY
ATTORNEY.

June 16, 1925.

B. J. HUBBARD

AUTOMOBILE SIGNAL

Filed Jan. 13, 1917

1,541,816

2 Sheets-Sheet 2

WITNESSES:
Karl A. Peters.
H. L. Lawrence

INVENTOR.
Burtt J. Hubbard
BY Clark P. Wood
ATTORNEY.

Patented June 16, 1925.

1,541,816

UNITED STATES PATENT OFFICE.

BURTT J. HUBBARD, OF KOKOMO, INDIANA.

AUTOMOBILE SIGNAL.

Application filed January 13, 1917. Serial No. 142,295.

*To all whom it may concern:*

Be it known that I, BURTT J. HUBBARD, a citizen of the United States, residing at Kokomo, in the county of Howard and State of Indiana, have invented a new and useful Improvement in Automobile Signals, of which the following is a specification.

My invention relates to signal lights for automobiles and similar vehicles and its purposes are to make a signal that shall be easily manipulated from the seat of the vehicle and that shall indicate to a following vehicle the intention of turning in either direction with the direction of turning or of stopping.

Figure 1:
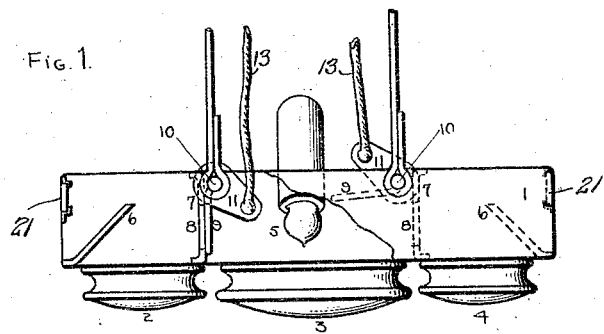
Figure 2:
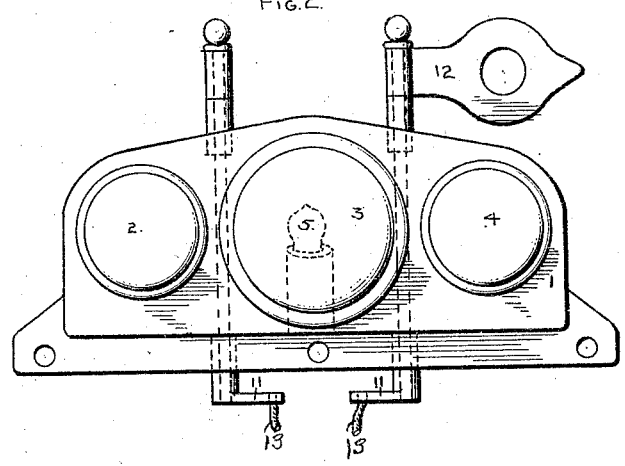
Figure 3:
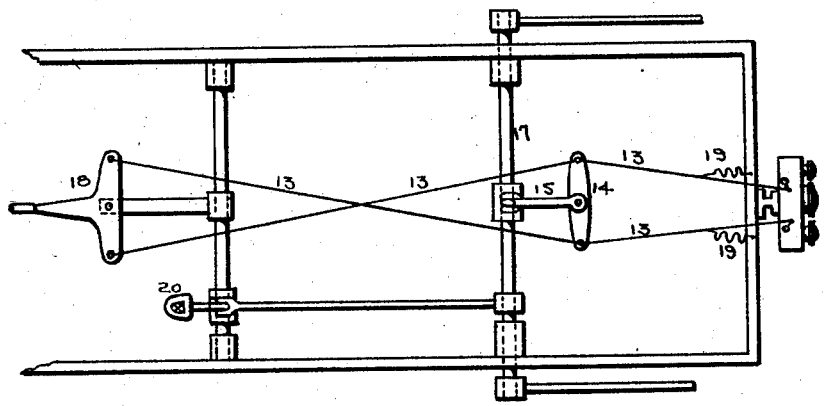
Figure 4:
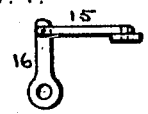

I attain these purposes by the means shown by the accompanying drawings in which Figure 1 is the plan view of my device from above, a part of the case being broken away to show the internal construction. Figure 2 is a view from the rear as it would appear to an individual in a following vehicle. Figure 3 is a diagram of the operating mechanism, and Figure 4 is a detail of one of the operating levers.

Referring more particularly to the drawings, 1 is the outer case of the device on the rear side of which are mounted three lenses, 2, 3 and 4. Behind, the lens 3 is mounted a lamp 5. The lens 3 is clear, the lenses 2 and 4 being colored preferably red and green. Behind each of the lenses 2 and 4 is mounted a mirror 6 set at an angle of substantially 45 degrees. The case 1 is divided by partitions 7 into three chambers, each of these partitions 7 is pierced by an opening 8 adapted to be closed by the lid 9 attached to the shaft 10 and operated by the lever 11. On the top of each of the shafts 10 is mounted an indicator 12 for use in the day time, as will be more fully explained hereafter. The levers 11 are connected by wires, cords or other suitable means 13, to the lever 14 connected by the link 15 and vertical arm 16 to the brake shaft 17 of the automobile. From the extremities of the lever 14 the wires 13 extend to the opposite extremities of the lever 18 mounted on the dash board of the vehicle, or in any other readily accessible location. These wires 13 preferably cross each other as shown in Figure 3. Springs 19 are connected to the wires 13 and the frame work of the machine so as to keep both of the openings 8 closed by the lids 9 at all times except when the signaling mechanism is actuated by the driver of the vehicle to indicate his intention to stop or to turn either to the right or left.

In addition to the openings I have already described, I prefer to leave the opening 21 at each end of my device shortening the mirror 6 for that purpose. By this means a side light, in addition to the rear light, will be shown in the direction of the turning.

The operation of my device is as follows:

Suppose the driver of the vehicle desires to signal that he desires to turn to the left. He moves the lever 18 over in the direction he intends to turn, that brings a tension on the wire 13 which is connected to the right hand arm of the lever and by reason of the crossing of the wires acts on the shaft 10 which acts on the lever 11 and the shaft 10 upon the lid 9 connected with the left hand lamp allowing the light from the lamp 5 to pass through the opening 8 on that side and strike the mirror 6 and by reflecting out so that the rear signal will show a white light with a colored light on the left hand side. In the same way, a turn to the right would be signaled by moving the lever over toward the right which would operate the lid 9 closing the opening 8 on that side and the white light would be shown in the center with a colored light on the right hand side of it. At the same time the indicator 12 would be placed in the position shown at the right in Figure 2 and would point the direction of the turn in the day time. If it is desired to stop, the action of the brake lever 20 on the brake shaft 17 causes it to revolve and moves the link 15 and thus the lever 14 directly toward the rear thus drawing equally on both of the wires 13 opening both of the lids 9 and showing the white center light with a colored light on each side.

I claim:

1. The combination with a vehicle, of a casing secured thereto having right and left signaling compartments, a source of illumination for each of said compartments, means whereby the driver of said vehicle can selectively illuminate said compartments to indicate an intended change in direction, and additional means whereby both of said compartments may be illuminated simultaneously to indicate that the vehicle is stopping.

2. A direction indicator for vehicles comprising a casing having partitions dividing said casing into right and left signaling compartments and an intermediate compartment, each of said compartments having a lens mounted in the rear wall thereof, each of said partitions having an opening therein, a pivoted closing member for each of said openings, auxiliarly direction indicating means carried by the pivots of said closing members exteriorly of said casing, an electric lamp mounted in said intermediate compartment adapted to be connected to a source of electric current, and cables extending exteriorly of said casing and adapted to be actuated to open either or both of said closing members to permit light from said lamp to pass into either or both of said signaling compartments simultaneously, each of said auxiliary signals being turned into signaling position upon the actuation of the corresponding cables to indicate in the day time, or when said lamp is not burning, an intended change in speed or direction of the car to which the indicator is attached.

3. A direction indicator for vehicles comprising a casing having partitions dividing said casing into right and left signaling compartments and an intermediate compartment, a source of light in said intermediate compartment, each of said compartments having a lens mounted in the rear wall thereof, said partitions having an opening therein, pivoted closing members to close each of said openings, a reflector mounted in each of said signaling compartments opposite the corresponding openings of said partitions, and means actuatable from the seat of the driver of the vehicle to which said indicator is attached for moving either or both closing members simultaneously to open position whereby light from said light source may enter said signaling compartments and be reflected by said reflectors through the lenses of said compartments.

4. A direction indicator for vehicles comprising a casing having partitions dividing said casing into right and left signaling compartments and an intermediate tail light compartment, said intermediate compartment having a source of light therein, each of said compartments having a lens in the rear wall thereof, and means actuatable from the seat of the driver of the vehicle for admitting light from said intermediate compartment to either of said signaling compartments to indicate an intended change in speed or direction of said vehicle, each of said signaling compartments having a second lens positioned in the ends thereof as a side signal to following vehicles during the changing of direction of the vehicle to which said indicator is attached.

5. In combination, a vehicle, a direction indicator attached thereto, said indicator comprising a casing having partitions dividing said casing into right and left signaling compartments and an intermediate compartment, a source of light in said intermediate compartment, each of said partitions having an opening therein, a pivoted closing member for each of said openings and cables operatively connected to said closing members, said vehicle having a brake shaft, a pivoted cross head operatively mounted thereon, a manually operable lever, said cables being attached thereto in such manner that either of said closing members may be moved to open position by actuating said lever thereby admitting light from said intermediate compartment to either of said signaling compartments to indicate an intended change of direction, said cables also being attached to said cross head whereby the actuation of said brake shaft will simultaneously move both of said closing members to open position thereby admitting light from said intermediate compartment to both of said signaling compartments to indicate that the vehicle is stopping.

6. In a device of the class described, a casing, said casing being divided by two partitions into a plurality of compartments, a light element mounted in one of said compartments, operable means for permitting light therefrom to enter said other compartments, means for operating said other means to admit light to one of said compartments at a time, and additional means for operating said other means to admit light to said compartments simultaneously.

7. The combination with a motor vehicle having a brake lever, of a casing having a tail light compartment, a light element mounted therein, a signaling compartment in said casing, and means operable by said brake lever for admitting light from said tail light compartment to said signaling compartment.

8. In a device of the class described, a casing, partitions dividing said casing into three compartments, the latter of said compartments constituting the right and left signaling compartments, means for effecting the illumination of one or the other of said signaling compartments, said means comprising a manually operable lever adapted to be inclined in either the right or left direction to cause the illumination of the right or left signaling compartment, respectively, said compartments being illuminable one at a time only by means of said lever, and additional means for causing the illumination of both said signaling compartments simultaneously to constitute a stop signal.

9. The combination with a motor vehicle having a brake lever, of a casing enclosing right and left direction indicating means, a light element mounted exteriorly of said indicating means, and means associated with said brake lever for permitting said light element to illuminate both said indicating means simultaneously.

10. In combination with a motor vehicle having a brake actuated lever, a cross-head pivotally carried thereon, a casing adapted to be mounted at the rear of said vehicle, apertured partitions therein dividing said casing into three compartments, a source of light in the intermediate of said compartments, closing members for said apertures, and an operating lever adjacent the seat of the driver of said vehicle, and cables from each of said closing members to said cross-heads whereby said closing members may be simultaneously operated by said brake lever, said cables extending from said cross-heads to said operating lever whereby said closing members may also be selectively operated, the actuation of said closing members serving to admit light from said intermediate compartment to an adjacent compartment.

11. The combination with a car, of a casing secured thereto, a source of light within said casing and right and left turn indicating means associated with said source of light for indicating an intended change of direction of said car, said indicating means being simultaneously operable to constitute a stop signal.

BURTT J. HUBBARD.

Witnesses:
A. G. Dawson,
Edna Snyder.